Jan. 19, 1960 S. LEVINE ET AL 2,922,140
SELECTIVELY DIRECTIVE COMPRESSIONAL WAVE TRANSDUCERS
Filed June 25, 1954 4 Sheets-Sheet 1
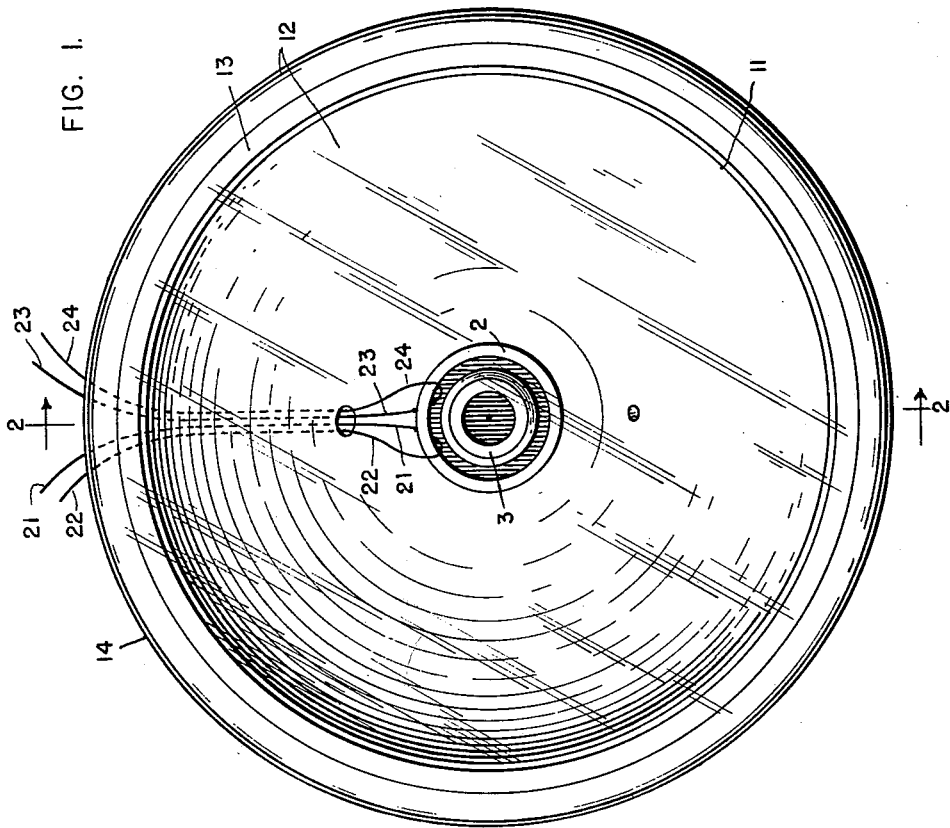
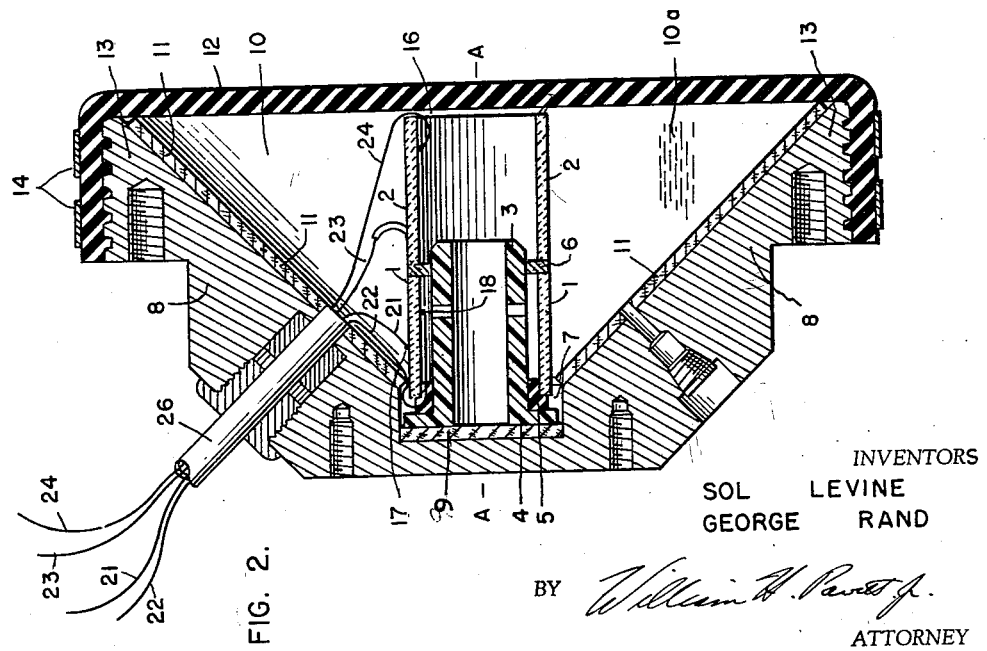
INVENTORS
SOL LEVINE
GEORGE RAND
BY *William H. Pavitt Jr.*
ATTORNEY

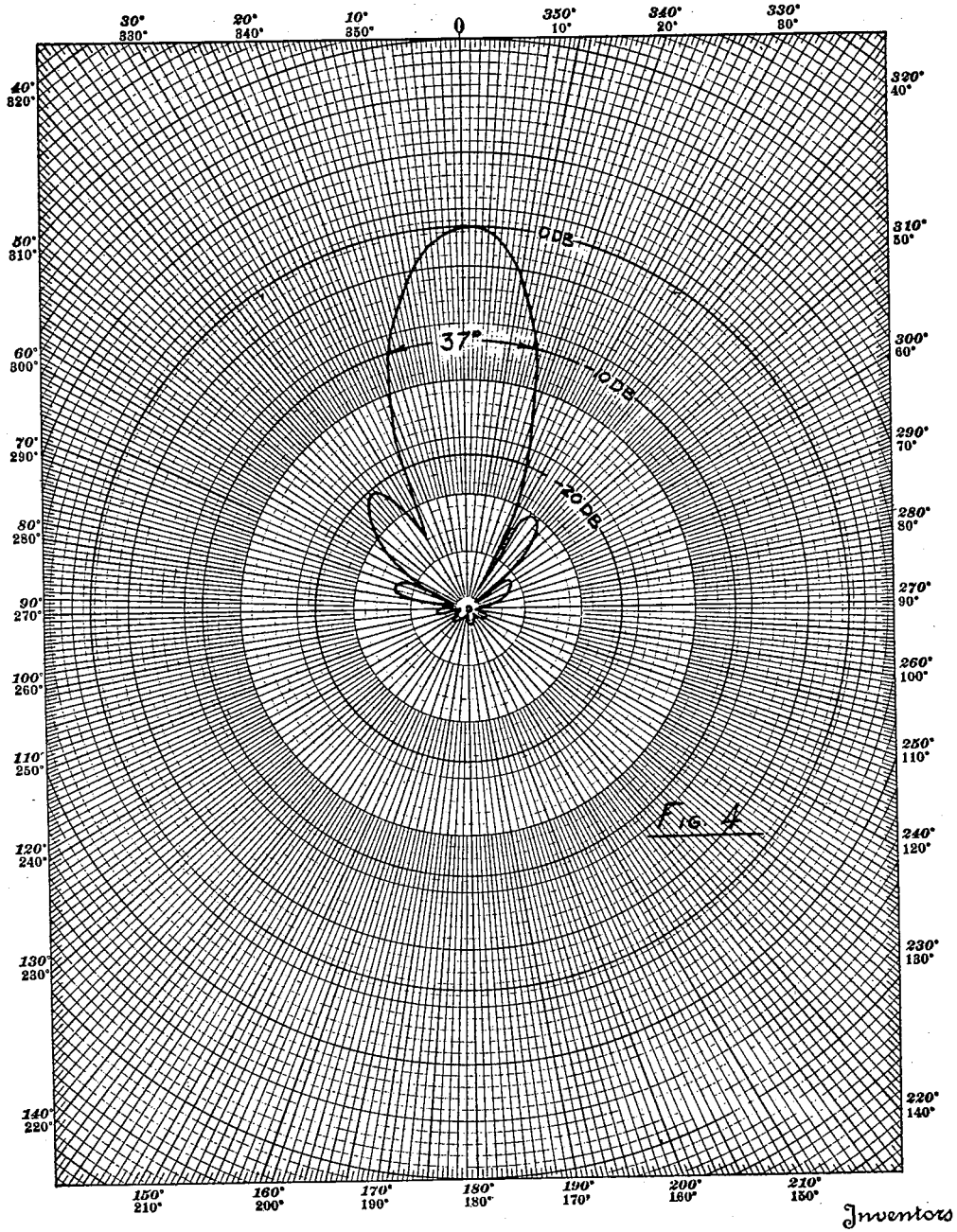

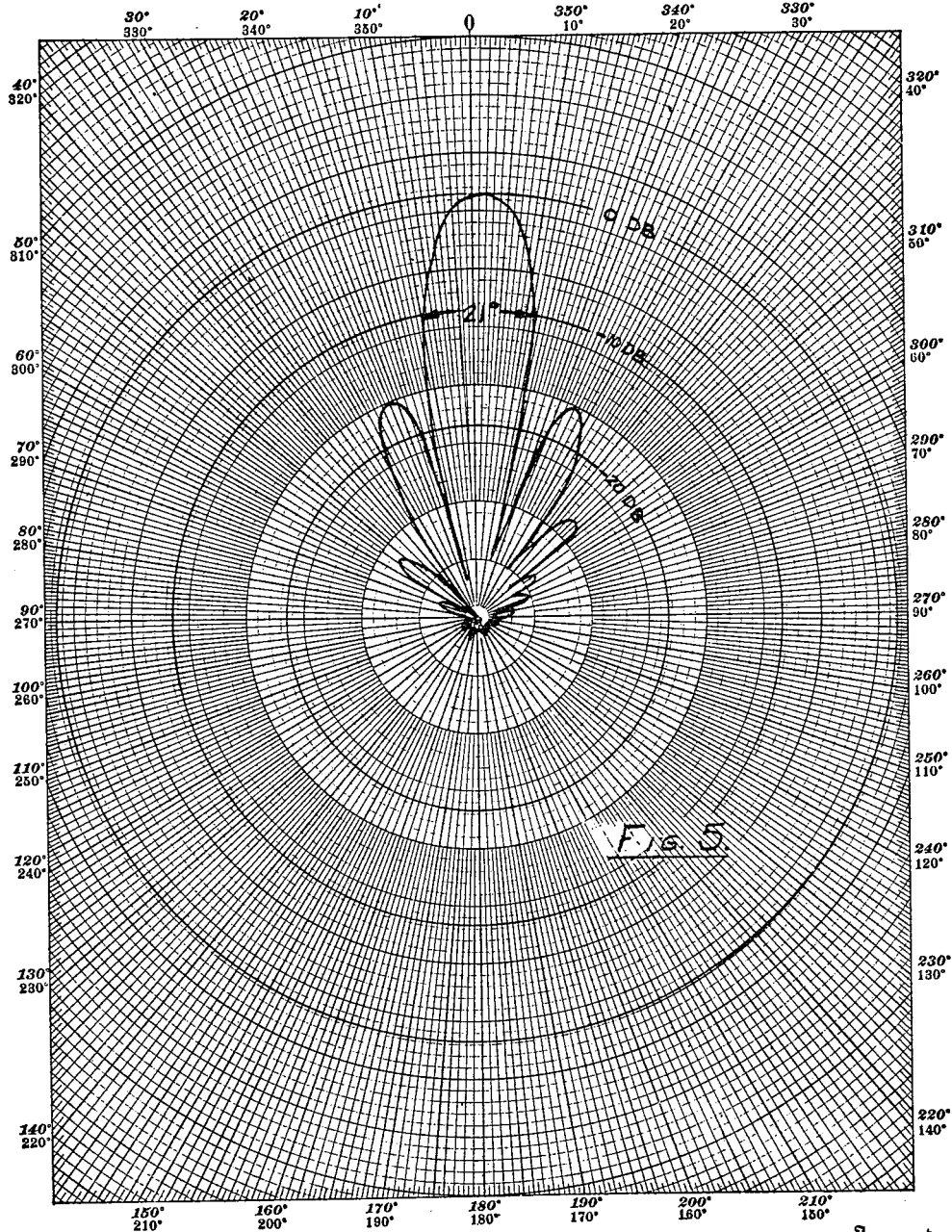

United States Patent Office 2,922,140
Patented Jan. 19, 1960

2,922,140

SELECTIVELY DIRECTIVE COMPRESSIONAL WAVE TRANSDUCERS

Sol Levine, Bayside, and George Rand, Fresh Meadows, N.Y., assignors to Edo Corporation, Long Island, N.Y., a corporation of New York Application June 25, 1954, Serial No. 439,244

7 Claims. (Cl. 340—9)

This invention relates to compressional wave transducers in general and in particular concerns a novel multi section tubular piezo-electric array especially adapted for underwater object detecting and locating apparatus, commonly known as "sonar gear."

It is an object of our invention to provide a transducer which is capable of emitting and receiving pulses of compressional wave energy in a broad beam pattern, or alternatively, without change of frequency of excitation, in a substantially narrower pattern.

It is also an object of our invention to provide a transducer the strength of the compressional waves emitted by which can be increased without increasing the voltage peaks of the exciting electrical pulses at risk of damaging the elements of the array.

It is a further object to construct a transducer of small overall dimensions but which is capable of providing a highly directive beam.

The foregoing and other objects are accomplished in our novel transducer, the preferred embodiment of which is constructed of a plurality of cylindrical shells of piezo-electrical material. These shells are preferably of equal diameter, disposed adjacent each other about a common axis, but separated from each other by a disc of corprene or other suitable material. This coaligned array, we dispose within a conical reflector. Appropriate electrodes and switching means are also provided to enable the operator to cause only one of the piezo-electric crystal cylindrical shells to be excited, or alternatively to cause all of the shells to be excited simultaneously. Our invention is further detailed hereinafter with reference to the accompanying drawings, in which:

Figure 1 is an elevation of the preferred embodiment of our transducer looking at the face thereof in the axis of the cone;

Figure 2 is a section taken on the line II—II of Figure 1;

Figure 4 is a presentation in polar coordinates of the beam pattern of our transducer when emissions are confined to only one of the two piezo-electric cylindrical shells; and Figure 5 is a presentation similar to that of Figure 4 showing the beam pattern when both cylindrical shells are excited.

Figure 3:
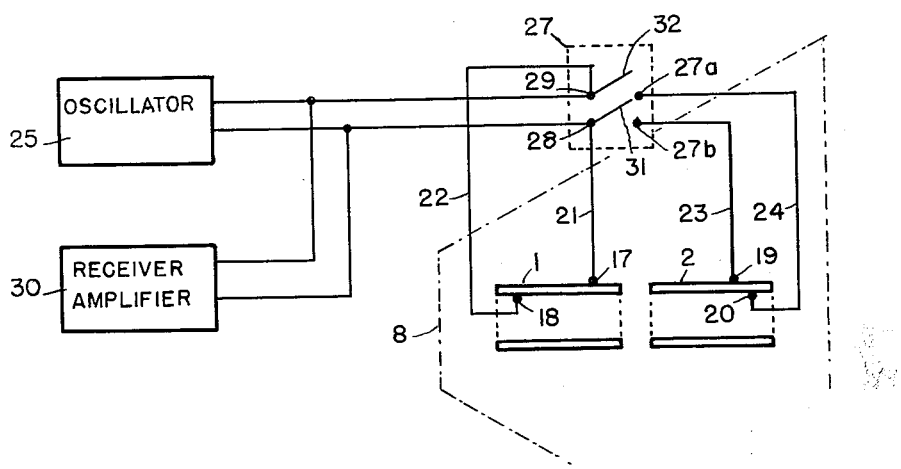
Figure 3 is a schematic view of our multi-section transducer with its associated switching means.

Referring to Figures 1 and 2, our novel transducer is comprised of two piezo-electric crystal tubular element shells 1, 2 of equal diameters disposed about a common axis A—A on a coaxial tube 3. The latter is formed of a rigid material, preferably Bakelite, with a flanged base 4. To provide the actual support for the pair of crystals, we slide onto the tube 3 a first annular member 5 which seats against the flanged base 4, and a second annular member 6. A portion of the outside diameter of member 5 is just slightly less than the inside diameter of crystal tube 1. Member 6, on the other hand, is more disc-like, with an inside diameter fitting snugly over tube 3, having an outside diameter greater than the corresponding diameter of the two crystals 1, 2. The latter may thereby be separated from each other by the thickness of members 6, to which their contiguous extremities are secured by suitable cement. Member 5 is made of resilient rubber and member 6 is desirably made of corprene or material of similar acoustic properties. The crystals 1, 2 are formed of a ferro-electric poly-crystalline dielectric material such as barium titanate of a thickness of about one-eighth of an inch and an outside diameter of one and one-half inches, so as to resonate at 37.5 kc. This twin crystal array is disposed within a cylindrical area 7 at the apex of a conical reflector 8 by cementing the base 4 to a heavier corprene disc 9 which tightly fits within such cylindrical area 7.

The reflector 8 we construct preferably of steel with walls defining an approximately forty-five degree angle conical area 10, as shown in Figure 2. This reflector serves to house the crystal array and acts as a reflector for the compressional wave signals which it emits. To improve the reflective characteristics of these walls, we have found it desirable to line them with a conical corprene shell 11 extending all the way in to the cylindrical area 7. The conical area 10 defined by the walls 11 is closed at its base by a heavy neoprene cap 12 which is made to fit tightly over the base 13 of element 8. The outside of base 13 is serrated or grooved, and stainless steel rings 14 are employed to press and seal the cover securely around the base 13. Direct contact between the right hand extremity of the pair of crystal shells 1, 2 with the neoprene cover 12 is preferably prevented by leaving a gap 16 between them. The term "corprene" as used herein is a composition, commercially available, of cork and neoprene. It has been chosen by us because it is light and will not absorb much oil or moisture and, since it is a substance contrasting greatly in its properties from water, acts as an excellent reflector of compressional wave vibrations. However, other substances such as cellular rubber having properties similar to those of corprene might also be employed, as will be readily appreciated by those skilled in the art of sound transmission in water.

The crystal shells 1, 2 are electrically connected to an exciting oscillator 25, shown only schematically in Figure 3, by electrodes 17, 18, 19 and 20 and the wires 21, 22, 23 and 24 of cable 26 (Figure 2). Leads 23, 24 run respectively from the electrodes 19, 20 of crystal 2, to the terminals 27a, 27b of the double pole single throw switch 27. Leads 21, 22 are permanently connected via switch terminals 28, 29 to both the oscillator 25 and the receiver amplifier 30. Arms 31, 32 of switch 27, connected respectively to terminals 28, 29 are ganged so that they may be moved simultaneously to close the terminals 27a, 27b, respectively.

The unoccupied portion of the conical area 10 is filled with castor oil 10a or some other medium having acoustic properties closely approximating those of the water in which it is contemplated using the apparatus.

Our novel transducer and system may be operated in the following manner. Oscillator action is initiated and arms 31, 32 of switch 27 are first left open. This results in energizing only the crystal tube 1. At a frequency of oscillation of 37.5 kilocycles we have found that a single section transducer of the dimensions illustrated and described produces a beam pattern of the character approximately as portrayed in Figure 4. It will be observed that in this pattern, the beam width in the desired direction is about thirty-seven degress at the minus ten decibel points. Since the transducer's compressional wave is disseminated over a relatively wide area, the range and definition of the instrument is not as good as where the beam is more directive and concentrated within narrower lobes. However, the wider lobe pattern does have some advantages in that it searches a greater area. To obtain a more concentrated and directive beam, we simply close the arms 31, 32 of switch 27 against their respective terminals 27a, 27b. This results in connecting additionally to the output of oscillator 25 and to the input of receiver 30 electrodes 19, 20, so that crystal 2 is also placed in circuit in parallel with crystal 1. The beam pattern will now be found to narrow substantially to the form of that of Figure 5. Note now that at the minus ten decibel points, the beam width is approximately 21 degrees. Such points, moreover, as well as the extremity of the main lobe appear somewhat further removed from the pole (source of emission), thus indicating a relative increase in acoustic source level.

While the foregoing represents the preferred embodiment of our invention, other alternative embodiments utilizing the principles herein taught by us will readily occur to others skilled in the art. For example, it would be possible to increase the number of coaligned sections to three or even four and to provide a switch of a corresponding number of positions so that a progressively narrower beam width could be obtained, if such should be desired. Or the double throw switch could be retained and connected to bring into circuit with the oscillator output, all other sections simultaneously so as to give either a wide beam pattern with a single section, or a very narrow pattern, when all sections are excited in parallel. It would also be possible to substitute for the barium titanate crystals other suitable piezo-electric materials which lend themselves to tubular construction, or a series of magneto-strictive transducer elements in the form of ring laminates. It would also be possible to employ a multisectional tubular or cylindrical array without a reflector, switching in the sections as desired to give desired beam width in a manner similar to what we have shown. All such variations we intend to comprehend within the scope of our invention.

While we have hereinabove described our invention with particular reference to the transmitting function of the transducer, it will be readily appreciated by those skilled in the art that our device may be equally well employed to provide a plurality of reception patterns. Thus, in a simple listening device, a transducer of the type of Figures 1 to 3, may be utilized to search either a wide area, when a single tubular element is switched into circuit with the receiver; or a narrower area, but extending at a somewhat greater distance from the transducer, if more than one tubular element is placed in circuit in parallel. In other words, the phenomenon of our device as a transmitter is reversible, and we intend also to include such feature within the scope of our invention.

We claim:

1. A compressional wave energy transducer system comprising a transducer having a reflector, said transducer having a plurality of substantially cylindrical elements housed by the reflector, said elements being adapted, when electrically excited, to vibrate radially, said elements further being separated longitudinally from each other and being disposed along a common axis, each of said elements further having a pair of electrodes, means to excite said elements electrically to cause them to vibrate, and means including a switch for connecting said exciting means in one position of the switch with the electrodes of less than the total number of said elements to produce a beam of one width and means connecting said exciting means in the other position of the switch with the electrodes of a greater number of said elements to produce a beam pattern of narrower width.

2. A compressional wave energy transducer system, said system comprising a transducer having a reflector, said transducer including a plurality of tubular shaped piezo-electric elements of ferro-electric polycrystalline dielectric material housed by the reflector and adapted, when electrically excited, to vibrate radially, said elements being of approximately the same outside diameter and further being disposed apart from each other along a common axis, each of said elements having a separate pair of electrodes, means to excite said transducer elements electrically to cause them to vibrate, means including a switch for connecting said exciting means in one position of the switch with the electrodes of less than the total number of said elements to produce a beam pattern of one width and means connecting said exciting means in the other position of the switch with the electrodes of a greater number of said elements to produce a beam pattern of narrower width.

3. The arrangement as described in claim 2 wherein the said tubular elements are disposed coaxially within a conical reflector housing, said disposition being accomplished by support means, said support means being of suitable acoustic material and further being secured in the apex of said conical reflector housing.

4. The arrangement as described in claim 3 wherein the reflector housing is provided with a cap of acoustic material, said cap fitting over and being secured about the base of said conical reflector housing, and the remainder of the volume within said housing and not occupied by said tubular elements and said support means being filled with a fluid, said fluid having acoustic properties similar to the medium in which the transducer arrangement is to be employed.

5. A transducer system for transmitting and receiving compressional wave energy comprising a transducer having a reflector, said transducer having a plurality of cylindrical elements disposed within the reflector along a common axis and longitudinally separated from each other, said elements being adapted when electrically excited to vibrate radially and to generate compressional waves and further being adapted when mechanically vibrated radially to generate electrical waves, means to electrically connect any selected number of said elements together, and means to connect the selected number of said elements to a source and receiver of electrical wave energy.

6. A transducer system for transmitting compressional wave energy comprising a transducer having a reflector, said transducer having a plurality of cylindrical elements disposed within the reflector along a common axis and longitudinally separated from each other, said elements being adapted when electrically excited to vibrate radially and to generate compressional waves, means to electrically connect any selected number of said elements together, and means to connect the said selected number of elements to a source of electrical wave energy.

7. A transducer system for receiving compressional wave energy comprising a transducer having a reflector, said transducer having a plurality of cylindrical elements disposed within the reflector along a common axis and longitudinally separated from each other, said elements being adapted when mechanically vibrated radially to generate electrical waves, means to electrically connect any selected number of said elements together, and means to connect the said selected number of elements to a receiver of electrical wave energy.

References Cited in the file of this patent

UNITED STATES PATENTS

| | | |
|---|---|---|
| 1,059,665 | Fessenden | Apr. 22, 1913 |
| 1,662,247 | Hahnemann | Mar. 13, 1928 |
| 2,064,911 | Hayes | Dec. 22, 1936 |
| 2,332,541 | Turner | Oct. 26, 1943 |
| 2,586,827 | Karlson | Feb. 26, 1952 |
| 2,617,874 | Lewis | Nov. 11, 1952 |
| 2,618,698 | Janssen | Nov. 18, 1952 |
| 2,708,742 | Harris | May 17, 1955 |
| 2,762,032 | Vogel | Sept. 4, 1956 |